July 10, 1962 R. REQUA 3,043,626
ADJUSTABLE HEADREST CUSHION
Filed May 31, 1960
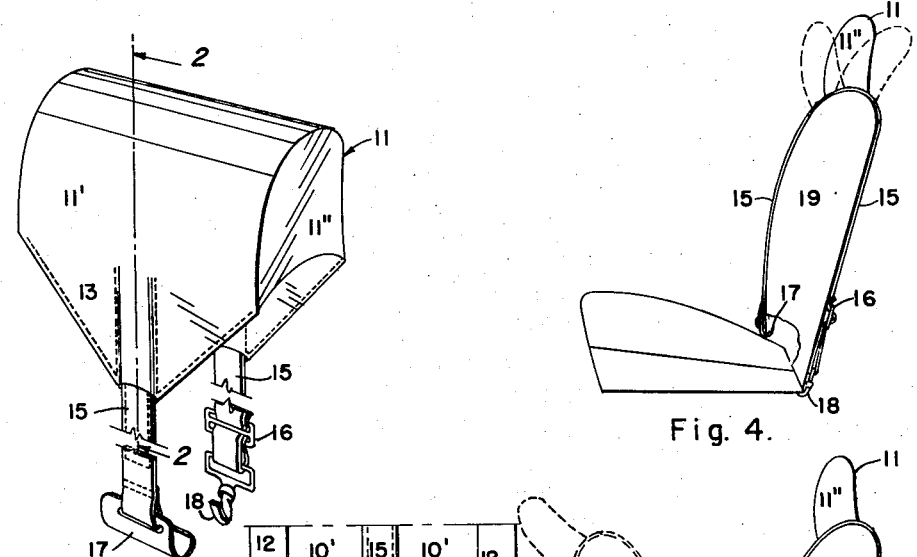
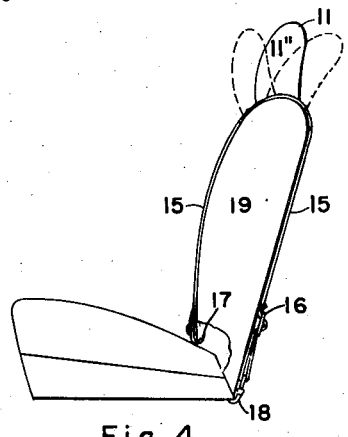
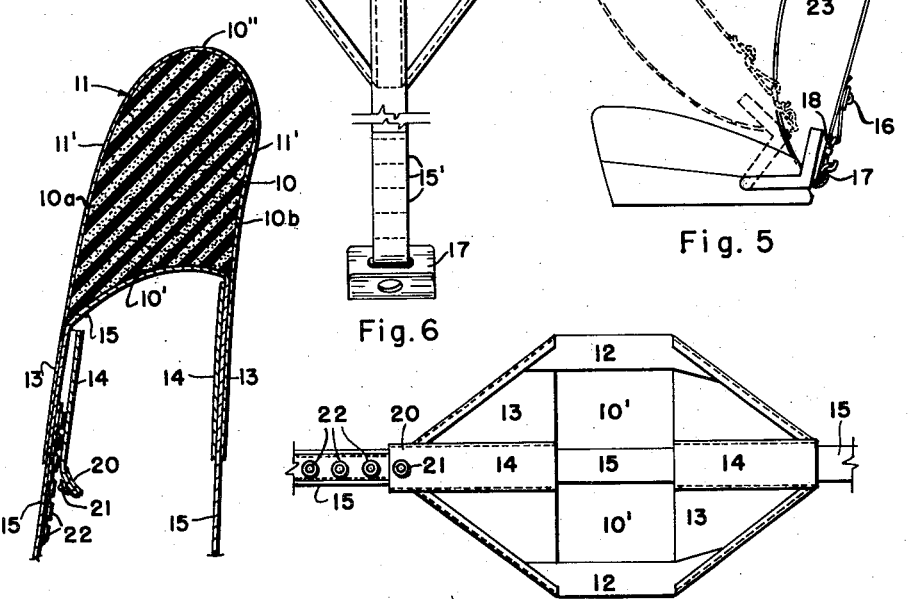
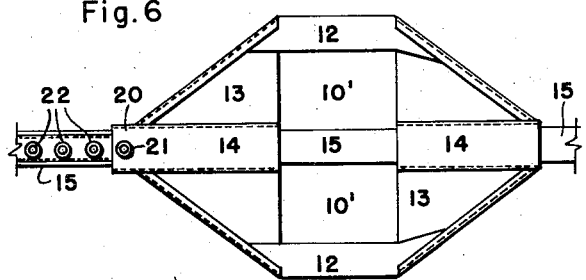
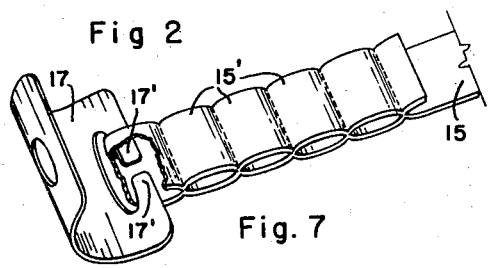
INVENTOR.
Roy REQUA
BY
ATTORNEY

United States Patent Office 3,043,626
Patented July 10, 1962

3,043,626
ADJUSTABLE HEADREST CUSHION
Roy Requa, 5801 Federal Blvd., Denver 11, Colo.
Filed May 31, 1960, Ser. No. 32,938
13 Claims. (Cl. 297—397)

In functional analogy with, as a development from, and in certain respects an improvement over the disclosures of my earlier Letters Patent of the United States, No. 2,874,757, dated February 24, 1959, this invention relates to accessory facilities adapted for convenient detachable association with the back sections of conventional seat organizations of diverse type and construction as a headrest supplement thereto effective to promote ease and comfort of seat occupants, and more particularly to such a facility especially adapted for operative association with the back sections of seats conventionally provided for passenger use in transportation equipment, such as automobiles, motor and railway coaches, aircraft, and the like, and has as an object to provide a novel and improved accessory headrest unit of enhanced expediency, practicality, and utility.

A further object of the invention is to provide a novel and improved accessory headrest unit convenient of detachable operative association with and to extend the height of the back sections of conventional automobile seats, and the like, without permanent attachment to or occasion for modification of the conventional seat organization.

A further object of the invention is to provide a novel and improved accessory headrest unit that is simple and economical of production from known and readily-available materials.

A further object of the invention is to provide a novel and improved accessory headrest unit that is secure and sightly in use association with a seat back section.

A further object of the invention is to provide a novel and improved accessory headrest unit that is susceptible of simple optional adjustment angularly with respect to the plane of and linearly along an associated seat back section.

A further object of the invention is to provide a novel and improved accessory headrest unit that is inherently, adjustably, and comfortably conformable to the positional requirements and preferences of the user.

A further object of the invention is to provide a novel and improved accessory headrest unit that is adjustably conformable to secure operative association with seat back sections of varying shapes and structural particularity.

A further object of the invention is to provide a novel and improved accessory headrest unit that is amenable to production in an extensive range of sizes, variation of structural detail, materials, and colors.

A further object of the invention is to provide a novel and improved accessory headrest unit that is suited for cleansing, refurbishing, rehabilitation, and maintenance with facility and dispatch.

A further object of the invention is to provide a novel and improved accessory headrest unit that is durable and longlived in use, expedient of shift from one and to another use position on the same or alternate mounting, and that is positive and efficient in attainment of the ends for which designed.

With the foregoing and other objects in view, my invention consists in the construction, arrangement, and operative combination of elements as hereinafter set forth, pointed out in my claims, and illustrated by the accompanying drawing, in which—

FIGURE 1 is a perspective view of a typical embodiment of the invention as conditioned for installation in position of use, portions of the attaching elements shown in the view being broken away to conserve space.

FIGURE 2 is a transverse section, on a relatively-enlarged scale, vertically through the organization according to FIGURE 1 taken substantially on the indicated line 2—2 of said latter view, the attaching elements being largely omitted to conserve space.

FIGURE 3 is a bottom plan view of the organization according to FIGURE 1 with flexible skirt components of the unit assembly coplanarly and oppositely extended and the associated attaching elements largely omitted.

FIGURE 4 is an end view, on a relatively-reduced scale, of the improvement represented by the preceding views in mounted use association with one type of conventional automobile seat assembly, a portion of the latter being broken away to better disclose coactions characterizing the invention and available position adjustments of the so-mounted improvement being indicated by broken lines.

FIGURE 5 is a view similar to FIGURE 4 showing the improvement represented by the preceding views in mounted use association with an alternative, hinged type of conventional automobile seat assembly whereof the manipulable range is indicated by the broken line supplement to the view.

FIGURE 6 is a view of the skirt and strap elements at the left of FIGURE 3 as alternatively organized within the contemplation of the invention.

FIGURE 7 is a fragmentary, detail, perspective view, on a relatively-enlarged scale, of the adjustable clip and strap coaction featuring the organization according to FIGURE 6.

The occasion for and the desirability of a rest for the comfortable support of the head of one occupying a seat are so manifest as to preclude extended discussion thereof, and many such rests have been hitherto devised. However, the seats conventionally characterizing transportation facilities, especially those of the usual passenger automobile, provide no rest for the head of the occupant and are so low in the back section as to be inadequate for head support, whence derive avoidable passenger fatigue and discomfort developed to acute degree during long transits. While it is entirely practical to supply various headrest constructions in fixed association with the back sections of seats, automobile or other, such installations made subsequent to assembly of the seat require some reworking of the latter with consequent expense and undesirable permanent alterations, and the result is, at best, a fixed rest susceptible of little adjustment to accommodate user preferences and difficult of shift between alternative positions of use. The utility and advantage of an accessory headrest unit adapted for detachable and adjustable association with and in extension above the back sections of conventional automobile, and other, seats being obvious, the instant invention is hence directed to the provision of such a facility characterized by superior use comfort and amenability to mounting in adjustable use position without any reworking whatever of the seat assembly organization to which it is applied.

Advantageously adapted for production from known and widely-available fabric, flexible sheet, and resilient cushioning materials, the improvement illustrated and hereinafter described may be fashioned through simple forming, assembly, and fabricating operations from principal elements of such materials conventionally worked to the forms and for the associations hereinbelow set forth; production of the principal elements of the improvement from the respectively-appropriate materials of general availability serving to apply with practical effect the inherent properties thereof and to utilize the extensive range of textures and colors in any of which the fabric and sheet materials may be obtainable.

In the typical embodiment of the improvement illustrated by the views of the drawing, the cushioning, head support member of the unit is a generally-rectangular, homogeneous block 10 of appropriately-resilient material, such as sponge rubber, cellulose sponge, or the equivalent, sized, proportioned, and contoured to conformably align with rest upon the upwardly-directed, free margin of the back member of a conventional seat assembly with the longitudinal block dimension, or length, parallel to the seat back upper margin, the transverse dimension, or width, of the block extending upwardly from the seat back upper margin a distance desirably slightly less than the block length, and the minimum dimension, or thickness, of the block transverse of the seat back upper margin. Obviously susceptible of wide dimensional variation, the general proportions of the block 10 above suggested in conformity with the views of the drawing are effective to realize the purposes of the invention when said block is associated as subsequently described with a conventional automobile seat assembly back member in a minimum length adequate to accommodate and comfortably support the head of a seat occupant, in which correlation the block width is projected upwardly from the seat back upper margin in position to receive and support the head of the occupant and the thickness of the block is opposed with cushioning effect to the pressure imposed by the head of a seat occupant resting against the block and serves to significantly stabilize the block in any selected angular relationship with the seat back member whereto it is applied. Amenable within the scope and contemplation of the invention to considerable diversity of specific conformation, the generally-rectangular block 10 typifed by the views of the drawing has been found to be visually pleasing and functionally satisfactory in position of use when moderately troughed, or transversely concaved, throughout its side-marginal area adapted to bear upon the usually-rounded conventional seat back upper margin, as indicated at 10' in FIGURE 2, crowned, or transversely convexed, along its side-marginal area remotely paralleling the concaved area 10', as at 10'' in FIGURE 2, laterally slightly convex between margins of said areas 10' and 10'' at the side of the block designed to coact with the head of a seat occupant, as at 10a in FIGURE 2, and laterally slightly concave between margins of said areas at the other side of the block, as at 10b in the view just noted, and end-limited by flat planes, either parallel or slightly convergent away from the area 10', transversely intersecting and determining the lengths of the contoured block areas above described.

In any preferred appropriate conformation and dimensional particularity, the homogeneous block 10 of suitably-resilient material is snugly received within and largely enveloped by a pouch 11 formed from flexible sheet material, fabric or other, to smoothly envelop the entire surface area of the block with the exception of the concaved block area 10', which pouch is desirably fabricated from a length 11' of the sheet material appropriate to transversely cover and extend at each end beyond the block areas 10a, 10'', and 10b, and end panels 11'' of the sheet material shaped to coextensively overlie the end planes of the block in secure marginal attachment to opposite edges of the sheet length 11'. Separably encased by the pouch 11 without direct attachment thereto, the block 10 is retained therein with the pouch extended to smooth enveloping relation therewith by means of flexible sheet or strip material flaps 12 transversely overlying areas of the surface 10' at the opposite ends of the block in secure outer side attachment to the respectively-adjacent free end edges of the pouch end panels 11'' and end attachment to proximate zones of the sheet length 11'; the resilient nature of the block 10 and the flexibility of the pouch components, including the flaps 12, accommodating optional removal and replacement of the block with respect to its encasement by the pouch.

In accordance with and to give practical effect to the concept and principles of the instant invention, the obviously-serviceable headrest cushion comprised from the block 10 enveloped by the pouch 11 is ingeniously adapted for secure attachment and optional adjustment in use position upon back sections of diverse conventional seat organizations through the provision of means unitarily associated with the pouch. Featuring the attaching means of the invention as typified by FIGURES 1, 2, and 3 is an integral, symmetrically- and outwardly-convergent skirt 13 extending each end of the sheet length 11' beyond the pouch cavity encasing, or adapted to encase, the block 10 and flat slide loops 14 of flexible material fixed medially of the opposed inner faces of said skirts to traverse the full extension thereof away from the pouch in alignment transversely of the block and pouch assembly, which slide loops may result from a stitching of strips to the skirts in a manner to leave open both ends of the channels so comprised. The slide loops 14 slidably accommodate and retain a flexible strap 15 longitudinally adjustable therethrough across the exposed area 10' of the block engaged within the pouch, as clearly appears in FIGURE 3, whereby said strap is applied to aid in the retention of the block within its pouch and, when tensed, to hold the pouch in smooth covering relation with the block. Length-adjustable in a conventional manner typified by the clip 16, the strap 15 has a minimum length adequate to vertically embrace the back sections of conventional seat assemblies whereto the improvement is applicable and fixedly connects at that one of its ends at the slightly-convex side of the cushion with an inturned, hook-type, rigid clip 17 and at its other end with an inturned hook 18 subject to the length adjustment provided by the clip 16. The inturned zone of the clip 17 is intersected by a hole, not shown, engageable at times by the hook 18 for intercoupling of said elements.

Constituted as shown and described, the strap 15 with its elements 16, 17 and 18 is manipulable in a simple and obvious manner to adjustably mount and secure the associated cushion in position of use on a seat back section of either fixed or foldable type. When, as represented by FIGURE 4, the unit of the improvement is to be applied to use with a seat back section 19 of fixed type, the clip 17 is hooked under the forward, lower margin of the seat back cushion subject to retaining pressure of the seat cushion and the strap 15 is extended upwardly over and downwardly behind the back section to attachment of the hook 18 at its other end with structural components of the seat, such as spring wires, available under rearward elements of the seat assembly; the length adjustment of the strap afforded by the clip 16 permitting snug tensioning of the strap in secure embracing relation with the back section 19. Slidably engaged through the loops 14 of the pouch skirts, the tensioned strap 15 serves to clamp the pouch 11 and its cased block 10 to the upper margin of the back section 19 in any desired fore-and-aft adjustment thereon and to extend the skirts 13 smoothly over and downwardly along the front and rear surfaces of the section, in which association the concaved surface 10' of the block is directly applied with high frictional effect due to the nature of the block material to the upper margin of the section 19 in a manner resisting inadvertent displacement of the mounted headrest cushion from its selected position of adjustment on the section. Supplementing the frictional interengagement of the block 10 with its use support to positively retain the headrest cushion as adjusted against fore-and-aft displacements, a tab extension 20 of the slide loop 14 at the forward side of the attachment is equipped with a snap fastener element 21, or the equivalent, disposed for selective coaction with one or another complementary snap fastener element 22 fixed in spaced alignment to and longitudinally of the strap 15 area opposed to said tab, whereby, as is manifest, to accommodate optional attachment of the forward skirt 13 to selected points along the strap with consequent determination of an angular relation of the headrest cushion to the plane of the seat back section. Given a seat organization having a relatively-foldable back section 23, as represented by FIGURE 5, wherein there is no coaction of seat and back cushions effective to retain the clip 17 in functioning relation therebetween, mounting of the improvement is similar to that above described save for an adjustment of the strap length which will permit engagement of the hook 18 within the hole of the clip 17 to stress and retain said strap in embracing relation with the seat back section in all available adjustments of the latter; the other features of the improvement operating exactly as above set forth in association with the relatively-foldable seat back section indicated at 23.

The unique structural organization of the unit illustrated and hereinbefore described conditions the improvement of the invention for intended use in operative association with the back sections of conventional seat assemblies of different types at any preferred location longitudinally of the back section upper margin and in any one of several optional dispositions angularly and transversely thereof, whereby to present the head support cushion in position of practical use susceptible at any time of simple angular and longitudinal adjustment directed to satisfy the preferences and to enhance the comfort of the user. Frictional coaction of the block exposed surface 10' and the inner faces of the skirts 13 with upper margin and face surface areas of the associated seat back section under the snugging influence of the tensed attaching strap 15 adequately retain the mounted unit against displacement longitudinally of the seat back section margin in reaction to casual impacts and forces which may develop under expected conditions of use, and such frictions supplemented by the adjustable snap connection of the skirt tab 20 to the strap 15 effectively resist displacement of the cushion from its adjusted angular correlation with the seat back section to oppose with cushioning effect the pressures thereto applied by the head of a user. The nature and operative association of the block, pouch, skirt, and strap components accommodate separation and reassembly thereof with consequent facility of component cleansing, rehabilitation, repair, and alternative recombination, as may be desired, and the utilization of flexible sheet material for construction of the pouch and skirts in the manner set forth permits unrestricted choice of sheet material texture and color to match, complement, or contrast with the covering material of a given seat back section. When deemed to be desirable, the skirts 13 may be stiffened and reinforced with inner surface laminations of relatively less pliant material, as is common practice in the analogous art.

In all functional respects the equivalent of the arrangement according to FIGURES 1, 2 and 3, the alternative organization of the improvement represented by FIGURES 6 and 7 distinguishes but in detail of structural correlation contributing to facility and economy of unit production without impairment of unit utility and adaptability. Otherwise identical with the construction hereinbefore detailed, the modification according to FIGURE 6 dispenses with the slide loop 14 associated with the skirt 13 designed to overlie the forward surface area of a seat back section, with consequent elimination of the tab 20 and fastener elements 21 and 22, in favor of direct attachment of the contiguous zone of the strap 15, as by stitching, to said skirt and an adjustable association of the clip 17 with the terminal extension of said strap beyond said attachment to the skirt. While provision variously may be made for length-adjustment of the strap 15 portion between the clip 17 and the fixed attachment therof to the adjacent skirt 13, as by means of a conventional clip 16, or the equivalent, considerations of practicality and user comfort commend the adaptation detailed by FIGURE 7 wherein the terminal portion of the strap 15 connectible with the clip 17 is doubled upon itself and such doubled portion united at spaced intervals with transverse rows of stitching to establish a series of laterally-open loops 15' longitudinally thereof in any selected one of which the narrow side bar of the clip 17 may be operatively engaged in an obvious manner when said bar is transversely divided to present spacedly-opposed, like tongues 17'. With length-adjustment provided for the strap portions terminating in the clip 17 and hook 18, the strap affixed to one of the skirts 13 and free to slide in the loop 14 of the other skirt, and the complementary elements of the unit the same as previously discussed, it is manifest that the unit as alternatively organized is adjustably adaptable to practical use with all of the advantages and capabilities of the structure first discussed.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. An adjustable headrest cushion for detachable association with conventional automobile and analogous seat assemblies, comprising a homogeneous block of resiliently-yieldable material adapted to upstand from coaligned engagement with the upper margin of a seat back section in longitudinally and angularly shiftable coaction therewith, a pouch of flexible material conformably confining and separably encasing said block in exposure of the block area coactable with the seat back margin through an open zone of the pouch for direct, frictional seating on said margin, skirt continuations of said pouch outwardly from laterally-opposed open zone margins thereof, slide loops on opposed faces of said skirts aligned transversely and medially of the pouch open zone area, and flexible-strap attaching means adjustably accommodated in said loops across the exposed block area connectible with conventional elements of the seat assembly at each side and adjacent the lower margin of the seat back section adapted to snug the pouch-confined block to a secure frictional grip against the upper margin of said section.

2. An adjustable headrest cushion for detachable association with conventional automobile and analogous seat assemblies, comprising a homogeneous block of resiliently-yieldable material adapted to upstand from coaligned engagement with the upper margin of a seat back section in longitudinally and angularly shiftable coaction therewith, a pouch of flexible material conformably confining and separably encasing said block in exposure of the block area coactable with the seat back margin through an open zone of the pouch adapted to snug the pouch-confined block to a secure frictional grip against the upper margin of said section, skirt continuations of said pouch outwardly from laterally-opposed open zone margins thereof, slide loops on opposed faces of said skirts aligned transversely and medially of the pouch open zone area, flexible-strap attaching means adjustably accommodated in said loops across the exposed block area connectible with conventional elements of the seat assembly at each side and adjacent the lower margin of the seat back section, and complementary means on said attaching means and one of said slide loops selectively interengageable to adjustably couple the same.

3. The organization according to claim 2, wherein said block is generally rectangular in a length exceeding its width and a width exceeding its thickness, one long narrow edge area of the block is transversely concaved for coaction with the upper margin of the seat back section, the opposite long edge area of the block is transversely convexed, and a side surface of the block adapted for head support is moderately convexed between said concave and convex edge areas.

4. The organization according to claim 2, wherein said block is generally rectangular in a length exceeding its width and a width exceeding its thickness, one long narrow edge area of the block is transversely concaved for coaction with the upper margin of the seat back section, and said pouch conformably envelopes all block surface areas other than said concaved edge area.

5. The organization according to claim 2, wherein said pouch is formed with flaps of flexible material inwardly and transversely obstructing end portions of its open zone in separable retaining relation with ends of the encased block.

6. The organization according to claim 2, wherein said flexible-strap attaching means is length-adjustable between an inturned terminal hook connectible with structural elements of the seat assembly exposed thereunder and an inturned terminal clip receivable for retention over a forward, lower corner of the seat back section cushion.

7. The organization according to claim 2, wherein said flexible-strap attaching means is length-adjustable between an inturned terminal hook and an inturned terminal clip interengageable to establish the attaching means as a closed loop vertically embracing an appropriate seat back section.

8. The organization according to claim 2, wherein said complementary means selectively interengageable to adjustably couple the attaching means to the slide loop of one of the pouch skirts consists of a spaced succession of fastener components fixed in alignment to the inward surface of the flexible-strap attaching means for extension and retraction with the latter relative to an outer end of an associated slide loop, a flexible tab extension of said slide loop overlying the so-equipped attaching means, and a complementary fastener component fixed to said tab for optional coaction with a selected one of the components carried by the attaching means.

9. An adjustable headrest cushion for detachable association with conventional automobile and analogous seat assemblies, comprising a homogeneous block of resiliently-yieldable material adapted to upstand from coaligned engagement with the upper margin of a seat back section in longitudinally and angularly shiftable coaction therewith, a pouch of flexible material conformably confining and separably encasing said block in exposure of the block area coactable with the seat back margin through an open zone of the pouch for direct, frictional seating on said margin, skirt continuations of said pouch outwardly from laterally-opposed open zone margins thereof, a slide loop on the inner face of one of said skirts aligned transversely and medially of the pouch open zone area, flexible-strap attaching means adjustably accommodated in said loop across the exposed block area and fixed in traversing relation to the inner face of the other skirt, said strap means extending oppositely from and beyond the associated skirts, and fittings connectible with conventional elements of the seat assembly at each side and adjacent the lower margin of the seat back section terminating the strap means extensions in length-adjustable relation therewith and adapting the same to snug the pouch-confined block to a secure frictional grip against the upper margin of said section.

10. The organization according to claim 9, wherein the strap means extension outwardly from fixed attachment to the skirt is length-doubled and transversely interconnected at spaced intervals to define a series of laterally-open loops, and the fitting coactable with said extension is a laterally-arcuate clip formed with spacedly-opposed, like, marginal fingers operatively coactable with a selected one of said loops.

11. An adjustable headrest cushion assembly for detachable association with conventional automobile and analogous seat assemblies, comprising a homogeneous block of resiliently yieldable material adapted to upstand from co-aligned engagement with the upper margin of a seat back section in longitudinally and angularly shiftable coaction therewith, a pouch of flexible material conformably confining and separably encasing said block in exposure of the block area coactable with the seat back margin through an open zone of the pouch for direct frictional seating on said margin, skirt continuations on said pouch extending outwardly from laterally opposed open zone margins thereof, said skirt continuations tapering inwardly toward the outer extremity thereof; attaching means including strap means extending at least substantially centrally from said skirt extensions and carrying means for connection of said assembly with conventional elements of said seat, and means for adjusting the length of said strap means.

12. The assembly defined in claim 11 wherein said means for adjusting the length of said strap means includes a series of cooperating releasable fastener elements carried respectively by one of said skirt continuations and said strap means.

13. The assembly defined in claim 11 wherein said means for adjusting the length of said strap means includes transversely open loops forming at least part of said strap means and a connecting element forming part of said attaching means and releasably engageable by said loops.

References Cited in the file of this patent

UNITED STATES PATENTS

| | | |
|---|---|---|
| 497,697 | Wesson | May 16, 1893 |
| 2,553,385 | Ruth | May 15, 1951 |
| 2,756,808 | Eichorst | July 31, 1956 |
| 2,867,266 | Vogler | Jan. 6, 1959 |
| 2,874,757 | Requa | Feb. 24, 1959 |
| 2,884,991 | Bloomquist | May 5, 1959 |